United States Patent [19]
Henderson

[11] 3,837,090
[45] Sept. 24, 1974

[54] PROCESSING HEATED, MOISTURE LADEN GAS CONTAINING PARTICULATE MATTER

[75] Inventor: Eulas W. Henderson, Toledo, Ohio

[73] Assignee: Phillips Petroleum Company, Bartlesville, Okla.

[22] Filed: Nov. 20, 1972

[21] Appl. No.: 307,775

[52] U.S. Cl............................ 34/40, 23/314, 34/82, 55/89, 55/97, 55/210, 55/222, 55/259, 55/268
[51] Int. Cl............................................. F26b 3/32
[58] Field of Search ............... 55/84, 80, 85, 89, 97, 55/222, 267–269, 210, 259; 34/82, 79, 40; 23/314

[56] References Cited
UNITED STATES PATENTS

| | | | |
|---|---|---|---|
| 1,022,496 | 4/1912 | Muller et al. | 55/97 |
| 1,752,857 | 4/1930 | Seede | 34/79 |
| 2,973,249 | 2/1961 | Haas | 23/314 |
| 3,340,080 | 9/1967 | Henderson | 23/314 |
| 3,395,512 | 8/1968 | Finney, Jr. et al. | 55/80 |
| 3,437,321 | 4/1969 | Wilkinson | 34/79 |

*Primary Examiner*—Bernard Nozick

[57] ABSTRACT

A method and apparatus are provided for reducing the temperature of a heated, moisture laden gas containing particulate matter to condense at least a part of the moisture content from the stream and thereafter sufficiently increasing the temperature of the stream so that particulate matter can be filtered from the stream without further condensation of moisture. In one embodiment off-gas from a carbon black pellet dryer is treated to condense and remove moisture and thereafter subjected to indirect heat exchange with pellet dryer stack gases to raise the temperature of the off-gas sufficiently to permit filtering of particulate matter from the off-gas without further condensation of moisture.

5 Claims, 1 Drawing Figure

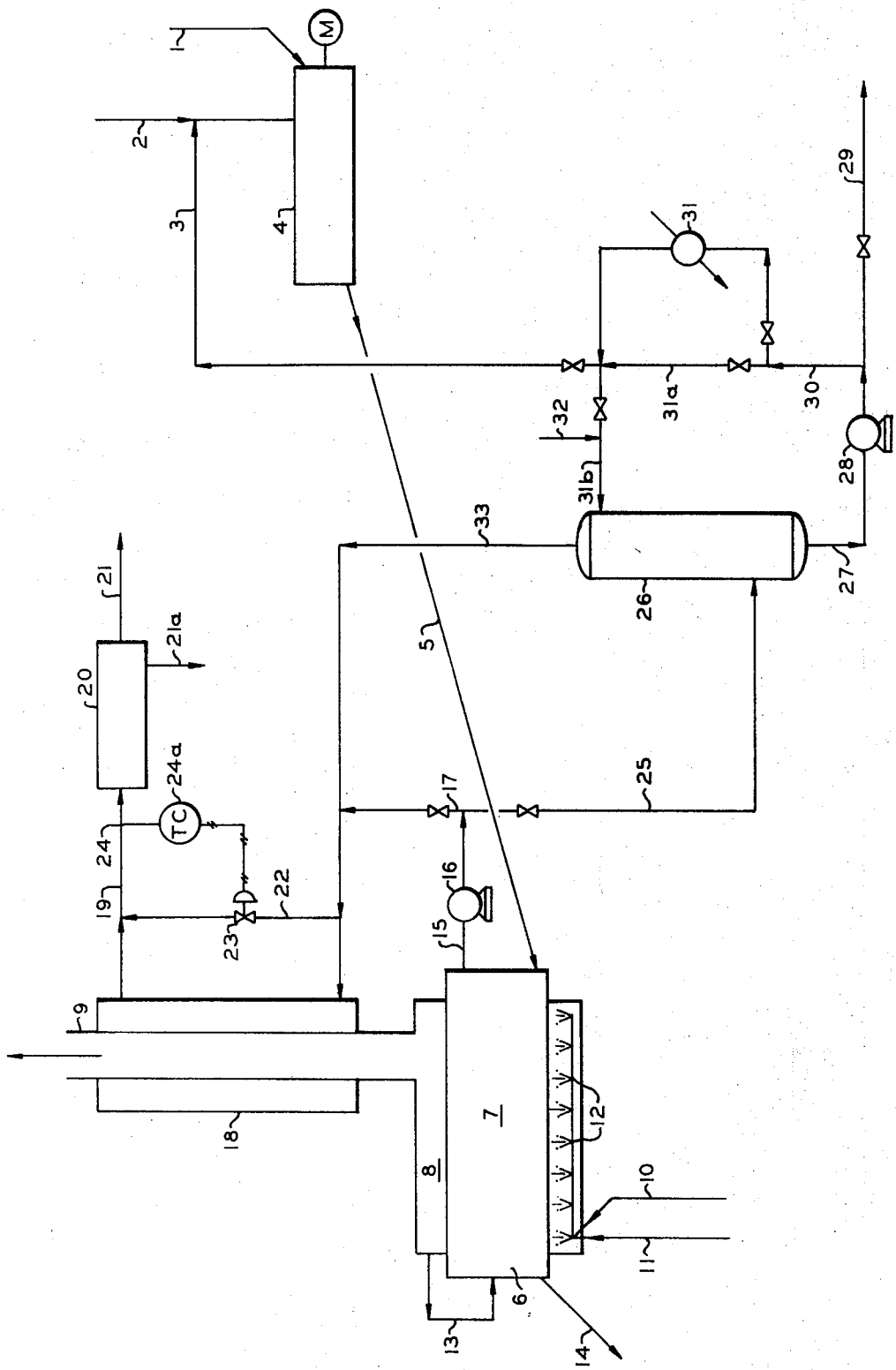

PROCESSING HEATED, MOISTURE LADEN GAS CONTAINING PARTICULATE MATTER

BACKGROUND OF THE INVENTION

This invention relates to the treatment of heated, moisture laden gas containing particulate matter. More particularly, it relates to treatment of wet purge gas from a carbon black dryer. In one of its aspects, this invention relates to removal of moisture from a gas stream. In another of its aspects, this invention relates to control of the temperature of a gas stream containing particulate matter and moisture. In still another of its aspects, this invention relates to removal of particulate matter from a gas stream containing moisture.

In one of its concepts, this invention relates to the removal of a sufficient quantity of moisture from a dryer off-gas stream to minimize water makeup in a carbon black pelleting process. In another of its concepts, this invention relates to reducing the filtering capacity required to remove particulate matter from a dryer off-gas stream in a carbon black process by manipulation of the stream temperature to remove excessive moisture and prevent the remaining moisture from condensing in a filter for removing particulate matter.

It is becoming increasingly important in industrial operations both to reduce the amount of particulate matter released into the atmosphere from industrial processes and to reduce the amount of water required from external sources as coolant for industrial processes. In an effort to improve operations, I have discovered that a carbon black process can be economically run to produce a more efficient internal use of water thereby minimizing the makeup water requirement and that by manipulation of the temperature of the off-gas from a carbon black pellet dryer, particulate matter can be efficiently filtered from the off-gas using a filter of reduced size.

It is therefore an object of this invention to provide a method and apparatus for treating a heated, moisture laden gas containing particulate matter to remove at least a portion of the moisture content and the particulate matter content. It is also an object of this invention to provide a method and apparatus for efficiently removing particulate matter and moisture from the off-gas from a carbon black pellet dryer. It is another object of this invention to provide method and apparatus for removing and utilizing moisture from the off-gas of a carbon black pellet dryer. It is still another object of this invention to provide a method and apparatus for controlling the temperature of the off-gas from a carbon pellet dryer to produce a gaseous stream from which moisture will not condense during the filtering of particulate matter from the off-gas stream.

Other aspects, concepts and objects of the invention are apparent from the study of this disclosure and the appended claims.

SUMMARY OF THE INVENTION

According to the invention, a method is provided for treating heated, moisture laden gas containing particulate matter. In this method the temperature of the gas is reduced to condense at least a portion of the moisture content of the gas. The condensed moisture is removed from the gas stream and the temperature of the gas stream is raised sufficiently to prevent condensation of moisture during removal of the particulate matter from the gas stream. At least a portion of the particulate matter is then removed from the gas stream.

In one embodiment of the invention, off-gas from a carbon black pellet dryer is reduced in temperature by countercurrent heat exchange with water to reduce the temperature of the off-gas sufficiently to condense moisture from the gas. The cooled gas is then indirectly heat exchanged with hot stack gases from the pellet dryer to raise the temperature of the off-gas sufficiently to allow the gas to be filtered without condensation of moisture from the gas.

In still another embodiment of the invention, part of the cooled off-gas from which condensed moisture has been removed is by-passed around heat exchange with the pellet dryer stack gas to control the temperature of the heated gas feed to the filtering apparatus at a predetermined level.

In a still further embodiment of the invention, water condensed from the pellet dryer off-gas is recirculated within the carbon black reaction and pelleting system to reduce the amount of makeup water necessary for operating the systems.

The method and apparatus of this invention can best be understood when studied in conjunction with the drawing which shows in line diagram form the interrelationships of the process of this invention. A discussion of these relationships is presented below using a carbon black system as an example of a process in which the method and apparatus of this invention is useful. Although a carbon black system is used as the example, it should be noted that this invention would be appropriate for use in treating any heated, moisture laden gas containing particulate matter. It should also be noted in the discussion below that the operating conditions of temperature and pressure cited would be the same for any practicable flow of solid material through the pelleter and dryer system. Rates of flow for solids, water, and gases have, therefore, not been cited.

Referring now to the drawing, flocculent carbon black at about 200° F through line 1 pelleting aid through line 2 and pelleting water through line 3 are fed into a carbon black pelleter 4 which is operated at a temperature of about 200° F. Wet carbon black pellets are expelled through line 5 into a pellet dryer 6. The pellet dryer comprises a dryer box 7, a dryer fire box 8 and a stack 9 for emitting hot gases from the dryer fire box.

In the dryer fire box 8 air is admitted through line 10 and fuel through line 11 for combustion in spaced combustion ports 12 to maintain an elevated temperature on the outside of the dryer box 7 and also to provide hot purge gas air at a temperature of 950° F which is fed in the dryer box 7 through line 13 in countercurrent flow with the wet pellets which have entered the dryer box 7 through line 5. As the wet pellets pass through the dryer box 7 — which is usually a rotating, elongated, baffled cylindrical surface — moisture from the wet pellets is picked up by the purge gas. Dried pellets at 450° F are emitted through line 14 from the dryer box 7. The purge gas, which is cooled to 300° F, is emitted from dryer box 7 through line 15 which can contain a gas compression means 16.

The water vapor-wet hot purge gas at about 300° F, and containing particulate matter, is passed through line 25 to a scrubbing column 26 to be countercurrently, and by direct contact, heat exchanged with water entering the scrubber by way of line 31b at about 180° F. For this example the scrubber is designed to operate at about 5 psig with scrubbing water and moisture condensed from the purge gas leaving the scrubber through line 27 at a temperature of about 190° F. This water can be pumped by pump 28 in part through line 29 and utilized as reactor quench. The major portion of this water is indirectly cooled in heat exchanger 31 (a portion may by-pass exchanger 31 by way of line 31a), and is returned to the scrubber by way of line 31b. Exchanger 31 can be an air-fin type cooler. Make-up water is added to the system by way of line 32. At least a portion of this cooled water is passed by way of line 3 to the pelleter 4, as above mentioned, as pelleting water. The water-scrubbed, cooled purge gas, at about 190° F, exits scrubber 26 via line 33. A portion of hot dryer purge gas 15 by way of compressor 16 can by-pass the scrubber 26 and be added by way of line 17 into the cooled, scrubbed purge gas in line 33. This conditioned purge gas in line 33, saturated with water vapor at its temperature, about 190° F, is heated, by indirect heat exchange in heat exchanger 18, with hot stack gases 9 flowing from the dryer fire box 8 at about 950° F. Heated purge gas, well below saturation with water vapor, at a temperature of about 450° F is passed by way of line 19 to purge gas filter 20. Clean, filtered purge gas is vented by way of line 21. Recovered carbon black is removed from filter 20 by way of line 21a.

In one embodiment line 22 can by-pass a portion of the purge gas 33 around exchanger 18 directly into line 19. Line 22 contains a control valve 23 actuated by a temperature sensing means 24 located in line 19 so that the purge gas will enter filter 20 at a preselected temperature which is sufficient to prevent condensation of moisture, contained in the purge gas, within filter 20. Temperature sensing means 24 can be a thermocouple whose signal is transmitted to a temperature controller means 24a whose set point is, e.g., 450° F. Temperature controller 24a manipulates by-pass valve 23 to blend the necessary portion of relatively cold purge gas 33, at about 190° F, with heated purge gas exiting exchanger 18 by way of conduit 19. Such control means and temperature sensing means, per se, are well known in the art and will not be detailed herein.

As can be seen above, the countercurrent scrubbing means, filtering means (e.g., bag filter), pelleting means, and pellet dryer can be any apparatus commonly used for these purposes, as known by those versed in the art.

Reasonable variation and modification are possible within the scope of the foregoing disclosure, the drawing, and the appended claims the essence of which is that a heated, moisture laden gas containing particulate matter can be reduced in temperature to condense at least a portion of the moisture content therein and then reheated to a temperature sufficient to prevent condensation of moisture from the gas stream while particulate matter is being removed by filtering means thereby allowing a reduction in the size of filtering capacity for the gas stream.

I claim:

1. A method for treating heated, moisture laden, particulate-matter-containing off-gas from a carbon black pellet drier, said method comprising: (a) reducing the temperature of said gas sufficiently by direct countercurrent scrubbing with water to condense at least a portion of the moisture content of the gas; (b) removing condensed moisture from the gas stream together with the water used for said countercurrent scrubbing; (c) raising the temperature of the gas stream of reduced moisture content obtained in step (b) sufficiently by indirect heat exchange with effluent stack gas from a pellet drier heater to prevent condensation of moisture during removal of particulate matter from said gas stream; and (d) removing particulate matter from the gas stream by filtering the heated gas stream to produce a gas stream of reduced particulate matter and moisture content.

2. The treatment of claim 1 wherein the temperature of said gas stream of reduced moisture content is controlled by by-passing sufficient gas flow around the heat exchange with effluent stack gas to maintain the raised temperature of the heat exchanged gas within a predetermined limit.

3. The treatment of claim 1 wherein the water condensed from the off-gas stream is used to provide water for uses within a carbon black reaction and pelleting system.

4. An apparatus for the treatment of heated, moisture laden, particulate-matter-containing off-gas comprising a carbon black pellet drier having a stack, conduit means for conveying said gas to a lower portion of a first heat exchange means comprising a scrubbing column; conduit means for introducing water into an upper portion of said first heat exchange means for cooling said gas sufficiently by direct countercurrent contact with water to produce at least partial condensation of moisture from the gas; conduit means for removing said condensation together with said water used for said countercurrent contacting from a lower portion of said scrubbing column; conduit means connected to an upper portion of said scrubbing column and a second heat exchange means for conveying cooled gas to said second heat exchange means; said second heat exchange means being in heat exchange relationship with said stock for indirectly heat exchanging said gas with effluent stack gas from said pellet drier passed in indirect heat exchange relationship therewith; conduit means connected to second heat exchange means and to a filter housing for conveying heated gas from the second heat exchange means to said filter housing and a means in said filter housing for filtering said gas with discharge means for both filtered gas and particulate matter.

5. An apparatus of claim 4 comprising a means for automatically bypassing a sufficient amount of said gas around the second heat exchange means to maintain said gas at a predetermined temperature.

* * * * *